United States Patent [19]

Barker

[11] Patent Number: 5,260,761
[45] Date of Patent: Nov. 9, 1993

[54] APPARATUS FOR THE MEASUREMENT OF SURFACE SHAPE

[75] Inventor: Andrew J. Barker, Orpington, England

[73] Assignee: Ometron Limited, London, England

[21] Appl. No.: 803,260

[22] Filed: Dec. 5, 1991

[30] Foreign Application Priority Data

Dec. 7, 1990 [GB] United Kingdom ............... 9026622

[51] Int. Cl.$^5$ ............................................... G01B 9/02
[52] U.S. Cl. ...................................... 356/4.5; 356/375; 356/376; 356/360
[58] Field of Search ................ 356/4.5, 376, 375, 356, 356/358, 380, 360

[56] References Cited

U.S. PATENT DOCUMENTS

| 4,884,697 | 12/1989 | Takacs et al. | 356/376 |
| 4,929,077 | 5/1990 | Huisen | 356/4.5 |
| 5,067,817 | 11/1991 | Glenn | 356/376 |

Primary Examiner—Davis L. Willis
Assistant Examiner—LaCharles Keesee
Attorney, Agent, or Firm—Frishauf, Holtz, Goodman & Woodward

[57] ABSTRACT

Apparatus for measuring the shape of a remote surface (10) comprises a laser (2) whose beam is split into a measuring beam (4) and reference beam (5). The reference beam is passed through a path length modulating mechanism (13, 14) to a datum point (18) while the measuring beam (4) is passed to a point (9) on the remote surface. The reflected beams return along the same paths and are combined at beam splitter (6). The interferometric pattern in the combined beams is analysed to determine the path length of the measuring beam while the transverse coordinates of the point (9) are determined from the position of a beam directing mechanism (12). This process is repeated for a number of points on the surface to measure the shape of the surface (10).

20 Claims, 2 Drawing Sheets

APPARATUS FOR THE MEASUREMENT OF SURFACE SHAPE

BACKGROUND OF THE INVENTION

This invention relates to an optical interferometric method and apparatus for the non-contacting measurement of the shape of a surface or structure.

Interferometric techniques for the measurement of surface shape are all based on an analysis of the interaction between a first or reference beam, normally contained within the housing of the measuring instrument, and a second or measuring beam which, after travelling from the measuring instrument to the test surface, is reflected back into the measuring instrument to interfere with the reference beam. In order to interfere, the first and second beams must be coherent; this can be arranged by using a beam splitter to derive both beams from a common source and ensuring that the difference in path length between the first and second beams does not exceed the coherence length of the source. The coherence length of the source is approximately equal to $\lambda^2/\Delta\lambda$, where $\lambda$ is the average wavelength of the source and $\Delta\lambda$ is the spectral width. Lasers can provide an extremely intense source of light with a long coherence length and are ideally suited to interferometric measurements on remote, optically rough surfaces. Indeed, with an efficient optical system design based on a focused measuring beam, it is possible to make interferometric measurements on natural engineering surfaces tens of meters distant from the measuring instrument with a measuring beam power of less than 1 mW. Laser systems limited to this power level enjoy the commercial advantage of being safe to use in an industrial laboratory with minimal disruption to normal working practices. The ease of manufacture and use of such systems is greatly enhanced if the laser beam is visible.

The shape of a remote surface may be measured by aiming the focused measuring beam of a laser interferometer sequentially at a matrix of locations on the surface. At each location, the coordinates of the point of measurement transverse to the measuring beam axis may be inferred from the beam aiming mechanism, while the distance along the measuring beam may be derived interferometrically. Known laser interferometric methods appropriate for measuring the distance to an optically rough surface make use of an optical frequency modulated source or a dual wavelength source; the round trip distance along the measuring beam is inferred from the measured frequency or phase of the interferometric modulation between the measuring beam and an internal reference beam derived from the same source. Whilst elegant in concept, such interferometric methods impose stringent requirements on the frequency stability of the laser source, the precision with which any necessary optical frequency modulation of the source can be implemented and the coherence length of the source, which must be at least as long as the maximum round trip path difference between the measuring beam and the internal reference beam.

It is an object of the present invention to obviate or mitigate these technical difficulties by providing an interferometric system based on the use of a short coherence length source without optical frequency modulation, the measuring accuracy of the system being independent of the frequency stability of the source.

SUMMARY OF THE INVENTION

Accordingly, the present invention provides a method of measuring the shape of a remote surface relative to a fixed reference datum comprising splitting the beam from a short coherence length source into a measuring beam and a reference beam, aiming by suitably encoded aiming means the measuring beam at a first measurement point on the remote surface, providing a fixed datum for the reference beam whereby the static optical path length traversed by the reference beam is nominally the same as that traversed by the measuring beam, providing in addition a dynamic optical path length modulator with suitable encoder means capable of varying accurately and repetitively the instantaneous optical path length traversed by either the reference beam or the measuring beam over a dynamic range encompassing the path length variations encountered by the measuring beam as it is moved from point to point over the remote surface, collecting a portion of the measuring beam reflected back from the remote surface, recombining that portion of the measuring beam with the reference beam, detecting by suitable detector means the variation of interferometric modulation between the measuring beam and the reference beam during the path length modulation cycle, determining from the detected variation of interferometric modulation the condition when the instantaneous path length of the reference beam is identical to the path length of the measuring beam at the first measurement point, inferring from the path length modulator encoder means the corresponding path difference between the first measurement point and the fixed reference datum, determining from the encoded measuring beam aiming means the coordinates of the first measurement point transverse to the measuring beam axis, moving the measuring beam to a second point and subsequent measurement points on the remote surface and repeating the above procedure to determine the path difference and transverse coordinates of the second and subsequent measurement points until the desired number of points have been measured on the remote surface.

Preferably the short coherence length source is a laser source. The laser source may be a laser diode emitting visible radiation. Alternatively, the laser source may emit invisible radiation in which case a separate visual channel may be provided to indicate the instantaneous position of the measuring beam. The radiation from several independent sources may be superimposed to synthesise a composite source having the required coherence length.

Preferably the fixed datum for the reference beam is established by aiming the reference beam at a reference reflector located alongside the remote surface. The reference beam may be switched between several fixed datum reflectors, the separation between the reflectors being precisely known, in order to extend the dynamic working range of the system as otherwise limited by the optical path length modulator.

The path length modulator may incorporate rotating or reciprocating mechanisms to vary the path length traversed by the reference beam. The path length modulator encoder means may operate indirectly by measuring the mechanical movement of said rotating or reciprocating mechanisms, the path length variation being inferred therefrom, but preferably the path length modulator encoder means comprises an independent interferometer system based on a long coherence length laser source, arranged to traverse the optical path through the path length modulator, thereby encoding the path length variation directly.

Any convenient two-beam interferometer system such as a Michelson or Mach-Zehnder interferometer may be used to split and recombine the measuring and reference beams. Preferably the interferometer system is arranged so that the outgoing measuring beam and the collected portion of that beam reflected back from the remote surface follow a common optical path, since this arrangement provides the maximum possible working depth of field.

Preferably the measuring beam is expanded and focused onto the remote surface by suitable optical means to reduce the size of the measurement point on the surface while increasing the magnitude of the collected portion of the measuring beam reflected back from the surface. The measuring beam may be kept in optimum focus on the remote surface by suitable automatic means, controlled from the measured path difference between the remote surface and the reference datum, or from an independent rangefinder of adequate precision.

The detector means to detect the interferometric modulation may comprise a single detecting element, but preferably comprises a pair of elements configured in differential mode such that on subtraction of the signals from the individual elements a composite signal is obtained in which the interferometric modulation depth is enhanced while noise fluctuations due to instability of the source or other electrical interference are suppressed. The quality of the detected signals may be further improved by the use of tuned amplification or phase sensitive detection techniques (lock-in amplification), the necessary frequency or phase reference being derived from the path length modulator encoder means.

For a proportion of the desired measurement points on the remote surface, laser speckle effects may result in the collected portion of the reflected measuring beam being insufficient for satisfactory operation of the interferometric modulation detector means. For these measurement positions, the path difference measurement may be repeated following a small displacement of the measurement point effected via the beam aiming means.

The coordinates of the measurement points derived by means of the method described in the present invention may be presented graphically as a perspective display or false colour display to enhance the visibility of specific surface features. Alternatively, the coordinates may be transferred to external data storage or data processing equipment for other purposes. The measured coordinates may be converted mathematically to corresponding coordinates in an alternative inertial frame of reference.

The invention also extends to apparatus for carrying out the above method.

The short coherence length source may be any source of ultraviolet, visible or infrared radiation but is preferably an efficient laser source of visible radiation such as a semiconductor diode laser emitting light in the wavelength range 500 to 670 nm, with a coherence length of 100 m or less. Preferably the laser source emits polarised radiation, and the two beam interferometer is constructed using one or more polarisation-sensitive beamsplitters in conjunction with appropriate retardation plates to maximise the optical efficiency of the apparatus. A composite source having the desired coherence characteristics may be synthesised by using prisms or other wavelength-selective or polarisation-selective beam combiners to superimpose the beams emitted by a plurality of individual sources.

In a preferred arrangement a Michelson interferometer is used to split the collimated beam from a short coherence length source into a measuring beam and a reference beam, but any alternative two beam interferometer such as a Mach-Zehnder interferometer may be employed.

Preferably the measuring beam is expanded prior to being focused by suitable lenses onto the remote surface. The focusing mechanism may be controlled automatically, using as a control input the distance along the measuring beam to the remote surface inferred from the most recent surface shape measurement or measurements. Alternatively, an independent ranging system of adequate precision may be employed to provide the necessary control input.

The measuring beam aiming mechanism may comprise mechanical means of swivelling or tilting the entire interferometer assembly, but is preferably based on the use of one or more tilting mirrors to deflect the measuring beam through the required angle. In one arrangement a pair of mirrors mounted on tilting mechanisms with their rotation axes mutually orthogonal are used to deflect the measuring beam. In an alternative arrangement a single mirror mounted on a two-axis gimbal mechanism is used to deflect the measuring beam. In either arrangement the mechanisms may be motorised and the precise angle of deflection imposed on the measuring beam may be determined from angular encoders attached to the beam aiming means.

The reference beam of the interferometer may be contained entirely within the main housing of the apparatus, but preferably emerges from the main housing to be aimed at a datum reference reflector located alongside the remote surface. Such an arrangement provides a convenient means of achieving approximately equal path lengths along the measuring and reference beams together with an element of compensation for the effects of differential movement between the remote surface and the main apparatus during the measurement period. Preferably the reference reflector is a corner cube retroreflector and the reference beam is expanded and collimated at a diameter similar to that of the corner cube retroreflector. In an alternative arrangement the reference reflector comprises retroreflective sheet or paint such as 3M type 7610 sheet or 3M type 7210 paint. A plurality of datum reference reflectors may be positioned at known distances alongside the remote surface, the reference beam being aimed at different reflectors in a defined sequence in order to increase or reduce the reference beam path length by precisely known amounts so as to extend the dynamic working range of the measuring system which may otherwise be limited by the dynamic range of the optical path length modulator. The reference beam aiming means may be motorised and controlled automatically to move the reference beam between different datum reference reflectors if insufficient path length variation is available within the dynamic range of the path length modulator.

The path length modulator may be constructed from a length of transparent material, the refractive index or length of which may be caused to vary in response to an applied electromagnetic, ultrasonic or thermal field.

In a preferred arrangement, the path length modulator incorporates a rotating or reciprocating mechanism to vary the path length traversed by either the reference beam or the measuring beam. The path length variation required of the path length modulator may vary depending on the measurement requirement, but might typically be in the region of 500 to 1000 mm. In one arrangement, a repetitive path length variation is provided by a single reflector or retroreflector mounted on a reciprocating mechanism, the mechanism being motorised by electrical, pneumatic or piezoelectric means.

In a second arrangement, a repetitive path length variation is provided by a plurality of reflectors or retroreflectors mounted in groups on one or more reciprocating mechanisms, similarly motorised, the reference or measuring beam being folded by multiple reflections through the plurality of reflectors or retroreflectors in order to achieve a more compact path length modulator.

In a third arrangement, a repetitive path length variation is provided by a rotating beam scanner which scans the reference or measuring beam across a reflective or retroreflective surface disposed relative to the scanner in such a way that the path length from the scanner to the surface varies in a known manner during the rotation cycle of the scanner.

The path length variation achieved using any of the above arrangements may be inferred from suitable encoder means attached to the relevant rotating or reciprocating mechanism. Alternatively, an independent laser interferometer traversing the optical axis of the path length modulator may be used to encode the path length variation directly.

In order to increase the speed or the overall dynamic range of path length modulation the collected portion of the measuring beam may be shared between and recombined with a plurality of reference beams, each reference beam or share of the measuring beam being provided with its own path length modulator and interferometric modulation detector.

The detector means to detect the interferometric modulation between the reference beam and the collected portion of the measuring beam may comprise a single detecting element or a pair of elements as described previously. The detector means may comprise a photocell, photodiode, electron multiplier phototube, semiconductor, pyroelectric, thermal or any other form of detector suitable for the type of radiation emitted by the source. The signals detected by the detector means may be amplified using tuned or lock-in amplification techniques as described previously, the necessary frequency or phase reference being derived from the path length modulator encoder means.

A complete measuring apparatus according to the present invention may incorporate analogue or digital data storage, processing or display means to control the measurement sequence of the apparatus over an array of predetermined positions on a remote surface, store and if required process the measured coordinates of the predetermined points, control if required the use of a plurality of datum reference reflectors, a plurality of path length modulators or a plurality of displaced, repeated measurement points as described previously, display the measured coordinates graphically as a perspective or false colour image or transfer the measured data to external data storage, processing, display or drawing equipment for other purposes.

A preferred embodiment of the invention will now be described by way of example with reference to the accompanying drawings, in which:

DETAILED DESCRIPTION

Figure 1:
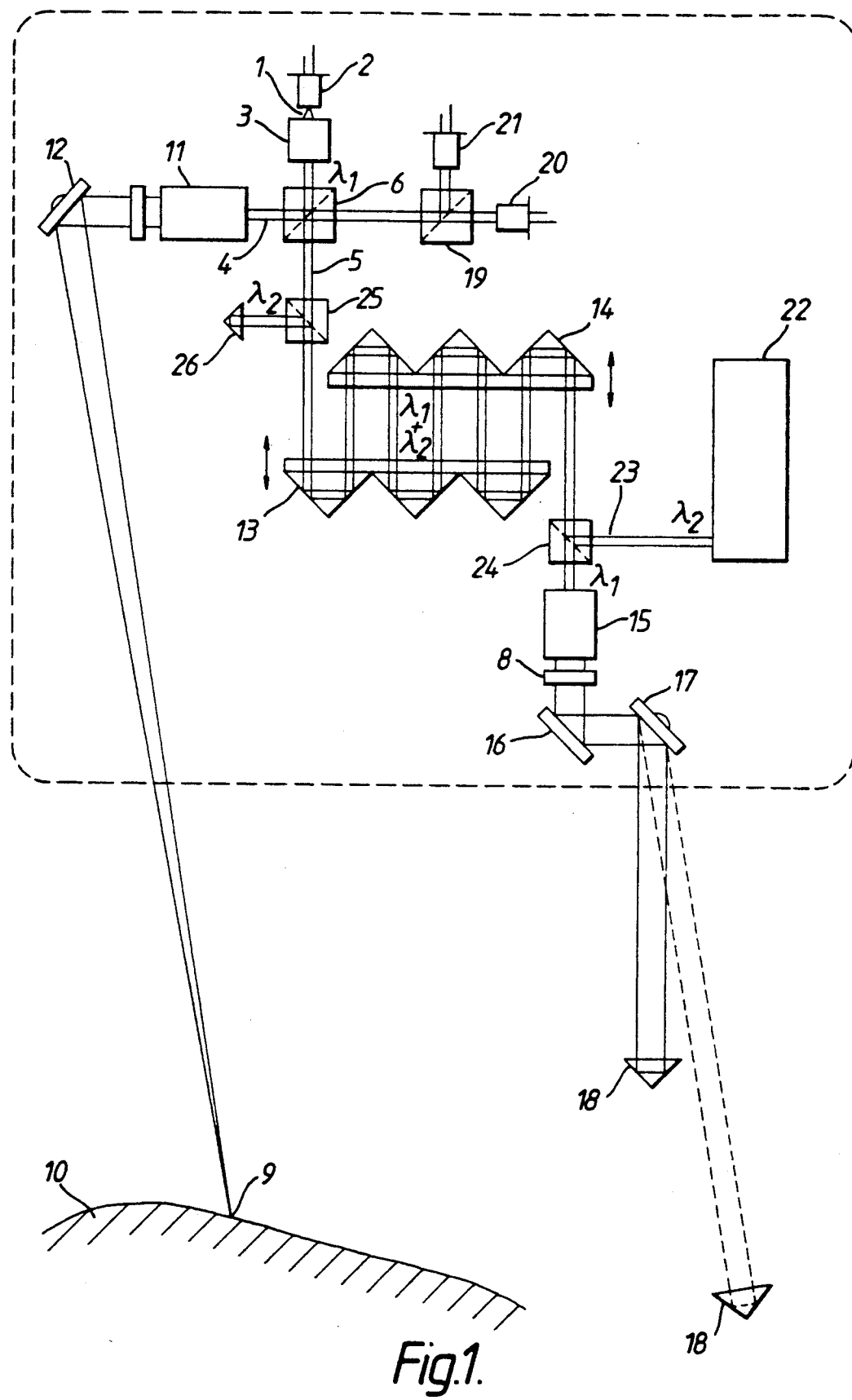
FIG. 1 is a schematic diagram of the optical system of an embodiment of the invention.

The embodiment of the invention shown in FIG. 1 is based on a Michelson interferometer in which the beam 1 from a short coherence length laser diode 2 emitting visible radiation of wavelength $\lambda_1$ is shaped and collimated by beam shaping optics 3 prior to being divided into a measuring beam 4 and a reference beam 5 by a beamsplitter 6. Beamsplitter 6 may be a polarising beamsplitter, in which case retardation plates 7 and 8 may be included to increase the efficiency with which the reference and measuring beams may be recombined. The measuring beam 4 is expanded and focused to a point 9 on a remote surface 10 by means of expansion and focusing optics 11. The position of point 9 on surface 10 may be varied by beam aiming means comprising a plane mirror 12 mounted on a servo-controlled and encoded galvanometer movement mechanism (not shown) to permit precisely controlled rotation of the measuring beam about a first axis. A second, similarly controlled mirror (not shown) intercepting the measuring beam before or after mirror 12 and rotating about a second axis orthogonal to the first axis may be used in conjunction with mirror 12 to move point 9 to any position on surface 10 within defined angular limits. Following reflection at point 9 a portion of the measuring beam is reflected back along its outgoing path to return to the beamsplitter 6.

The reference beam 5 passes through two arrays of retroflective prisms 13 and 14 before being expanded and collimated by beam expansion and collimation optics 15. A fold mirror 16 and beam steering mirror 17 are used to aim the reference beam at one or more remote retroreflective prisms 18. Following reflection at retroreflective prism 18, the reference beam retraces its path back to the beamsplitter 6.

Following recombination at beamsplitter 6, the combined measuring and reference beams are divided by beamsplitter 19 between two photodetectors 20 and 21 in such a way that the interferometric modulation between the measuring and reference beams is in antiphase on the two detectors, while other spurious noise fluctuations or electrical interference remain in phase on the two detectors.

Each of the arrays 13 and 14 of retroreflective prisms is mounted on a suitable mechanism (not shown) to provide reciprocating lateral motion in the direction indicated by the double headed arrows. The motion is arranged to be in antiphase, so that the individual arrays move towards or away from each other. In a preferred arrangement, each array is mounted on an arm attached to the moving spindle of a galvanometer movement mechanism. In an alternative arrangement, each array is mounted on a motorised, reciprocating linear movement mechanism.

When the separation of the arrays 13 and 14 changes, the path length traversed by the reference beam also changes. The path length variation may be determined from the mechanical movement of the arrays as measured by suitable encoder means attached to the movement mechanisms. The path length variation is a multiple of the mechanical movement of the arrays according to the number of individual retroreflective prisms used in the arrays. Preferably, the path length variation is measured directly by a second, independent laser interferometer 22 incorporating a long coherence length source of wavelength $\lambda_2$. The measuring beam 23 of interferometer 22 is superimposed with the reference beam 5 of wavelength $\lambda_1$ by means of dichroic beamsplitters 24 and 25 to follow a common path through the arrays 13 and 14 of retroreflective prisms. If the apertures of the individual elements of arrays 13 and 14 are sufficiently wide, beam 23 may be arranged to traverse the arrays alongside the reference beam 5, in which case beamsplitters 24 and 25 are not required. Retroreflective prism 26 returns beam 23 back through arrays 13 and 14 to interferometer 22.

In order to measure the shape of the remote surface 10, point 9 is positioned at a first measurement position using beam aiming means 12, the corresponding angular deflection coordinates of the beam being stored. Retroreflective prism 18 is positioned alongside surface 10, within the field of view of the reference beam steering means, and at a suitable distance from the main apparatus to render the overall path lengths of the measuring and reference beams approximately the same when the reference beam is centred on prism 18.

Figure 2:
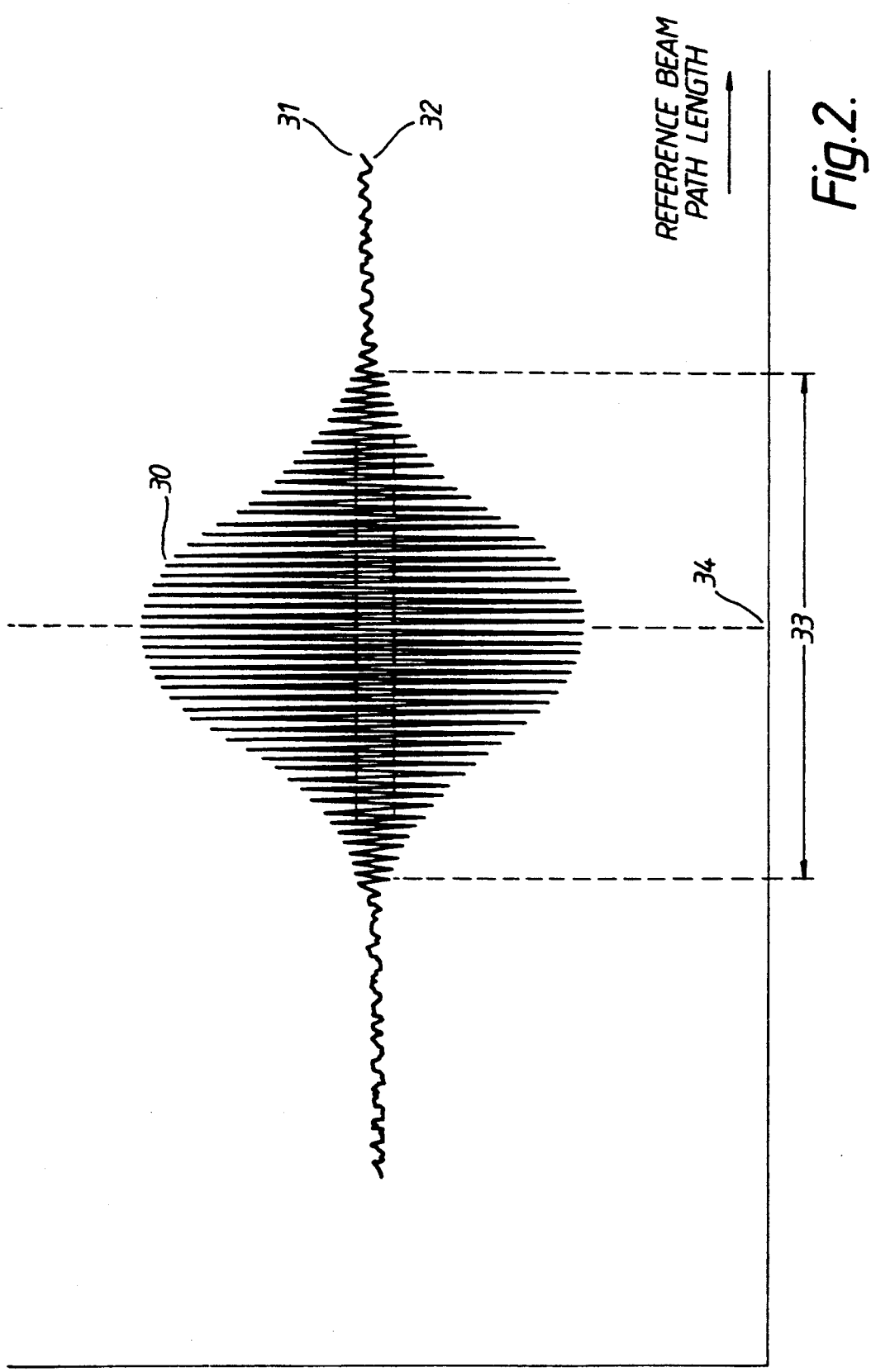
FIG. 2 is a schematic diagram of the interferometric modulation between the measuring beam and the reference beam during a measurement cycle of the embodiment of the invention shown in FIG. 1.

FIG. 2 shows the interferometric modulation between the measuring beam and the reference beam, as indicated by the difference 30 between the signals from detectors 20 and 21, during one cycle of movement of the arrays 13 and 14 forming the optical path length modulator. The interferometric modulation is distinguishable from background noise fluctuations over a path length variation 33, the extent of this variation being determined by the coherence length of the beam 1 from laser source 2. The pattern of variation of the strength of the interferometric modulation is generally symmetrical, rising to a peak value at a particular path length 34 when the path lengths of the measuring beam and the reference beam are equal. Suitable signal processing methods may be used to sense the condition of peak interferometric modulation; under this condition determination of the reference beam path length from the optical path length modulator encoder means in combination with the known static path length to retroreflector 18 is equivalent to measuring the optical path length of the measuring beam, thereby providing the additional coordinate necessary to fix the measured position of point 9.

Suitable signal processing methods are in themselves well known and include means to sense the central peak of the interference pattern 30 in real time. The interference signal is rectified and smoothed electronically to derive the modulation envelope of pattern 30; this envelope is then passed through a combination of threshold detectors at different levels together with a differentiating circuit to identify the central peak value. However, real time systems of this type face practical difficulties associated with large variations in the overall magnitude of interference signals obtained from different test surfaces 10 at different distances. Furthermore, interference pattern 30 is likely in practice to be of more complex shape, although retaining a central peak of greater amplitude than any subsidiary peaks.

Hence, in a preferred arrangement, the difference signal 30, or the modulation envelope of this signal, extending beyond preset limits 31 and 32, is digitised and stored as a function of the path difference determined from the output of laser interferometer 22. The pattern of variation of signal 30 thus stored is then processed digitally to locate the value of path difference corresponding with the centre of symmetry of the pattern.

Point 9 is then moved to a second and subsequent measurement positions using beam aiming means 12 and the above procedure repeated without moving prism 18, until the desired number of points on the remote surface have been measured. The coordinates thus measured may be converted mathematically to their equivalent values in an alternative coordinate system such as an xyz cartesian system with a defined Z axis direction. The mathematical conversion may take account of distortions or non-linearities in the beam aiming means used in the apparatus. One or more of the measurement positions may be calibration positions used to complete or confirm the accuracy of the mathematical conversion. The true coordinates of these calibration positions in the desired coordinate system must be known precisely using independent means.

I claim:

1. A method of measuring the shape of a remote surface relative to a fixed reference datum, comprising:

providing a coherent radiation beam, splitting the beam into a measuring beam and a reference beam, directing the measuring beam at a first measurement point on the remote surface, providing a fixed datum for the reference beam whereby a static optical path length traversed by the reference beam is nominally the same as a path length traversed by the measuring beam, modulating accurately and repetitively an instantaneous optical path length traversed by one of the reference beam and the measuring beam over a dynamic range, collecting a portion of the measuring beam reflected back from the remote surface, collecting a portion of the reference beam reflected back from the datum point, recombining the reflected portions of the measuring beam and the reference beam, detecting a variation of interferometric modulation between the measuring beam and the reference beam during a path length modulation cycle, determining from the detected variation of interferometric modulation a condition when the instantaneous path length of the reference beam is identical to the path length of the measuring beam at a first measurement point, determining a corresponding path difference between the first measurement point and the fixed reference datum, determining coordinates of the first measurement point transverse to a measuring beam axis, moving the measuring beam to a second and subsequent measurement points on the remote surface, and repeating the above steps for the second and each subsequent measurement point to determine a path difference and transverse coordinates of the second and subsequent measurement points until a desired number of points have been measured on the remote surface.

2. A method as claimed in claim 1, wherein the coherent radiation beam is provided by a short coherence length laser.

3. A method as claimed in claim 1, wherein the coherent radiation beam is invisible, and wherein a separate visual channel is provided to indicate a position of the measuring beam.

4. A method as claimed in claim 1, wherein a plurality of fixed datum points of known separation are provided for the reference beam, and wherein the method includes a step of switching between said plurality of fixed datum points.

5. Apparatus for measuring the shape of a remote surface, comprising:
a source of coherent radiation,
means for splitting a beam from said source into a measuring beam and a reference beam,
beam directing means for directing the measuring beam onto a measurement point on a remote surface,
a fixed datum for the reference beam,
a static optical path length traversed by the reference beam being nominally the same as a path length traversed by the measuring beam,
a dynamic optical path length modulator for varying an instantaneous optical path length one of the reference beam and the measuring beam over a dynamic range,
means for collecting a portion of the measuring beam reflected from the measurement point,
means for collecting a portion of the reference beam reflected from the datum,
means for recombining the reflected portions of the measuring and reference beams,
detector means for detecting a condition in which the instantaneous path length of the reference beam is identical to the instantaneous path length of the measuring beam at the measurement point,
means for determining a corresponding path difference between the measurement point and the fixed datum, and
means associated with the beam directing means for determining coordinates of the measurement point transverse to an axis of the measuring beam.

6. Apparatus as claimed in claim 5, wherein the source of coherent radiation is a short coherence length laser.

7. Apparatus as claimed in claim 5, wherein the fixed datum is a reflector.

8. Apparatus as claimed in claim 5, wherein the dynamic optical path length modulator includes means for varying the path length traversed by the reference beam.

9. Apparatus as claimed in claim 8, wherein said means for determining a corresponding path difference comprises an interferometer system having a long coherence length laser source whose beam traverses an optical path through the dynamic optical path length modulator to measure directly path length variation.

10. Apparatus as claimed in claim 5, wherein said detector means comprises a pair of detectors connected in a differential mode such that on subtraction of signals from the detectors a composite signal of improved quality is obtained.

11. A method as claimed in claim 2, wherein the coherent radiation beam is invisible, and wherein a separate visual channel is provided to indicate a position of the measuring beam.

12. A method as claimed in claim 2, wherein a plurality of fixed datum points of known separation are provided for the reference beam, and wherein the method includes a step of switching between said plurality of fixed datum points.

13. A method as claimed in claim 3, wherein a plurality of fixed datum points of known separation are provided for the reference beam, and wherein the method includes a step of switching between said plurality of fixed datum points.

14. Apparatus as claimed in claim 6, wherein the fixed datum is a reflector.

15. Apparatus as claimed in claim 6, wherein the dynamic optical path length modulator includes a means for varying the path length traversed by the reference beam.

16. Apparatus as claimed in claim 7, wherein the dynamic optical path length modulator includes a means for varying the path length traversed by the reference beam.

17. Apparatus as claimed in claim 6, wherein said detector means comprises a pair of detectors connected in a differential mode such that on subtraction of signals from the detectors a composite signal of improved quality is obtained.

18. Apparatus as claimed in claim 7, wherein said detector means comprises a pair of detectors connected in a differential mode such that on subtraction of signals from the detectors a composite signal of improved quality is obtained.

19. Apparatus as claimed in claim 8, wherein said detector means comprises a pair of detectors connected in a differential mode such that on subtraction of signals from the detectors a composite signal of improved quality is obtained.

20. Apparatus as claimed in claim 9, wherein said detector means comprises a pair of detectors connected in a differential mode such that on subtraction of signals from the detectors a composite signal of improved quality is obtained.

* * * * *